United States Patent
Danielsson et al.

(10) Patent No.: US 12,307,722 B2
(45) Date of Patent: May 20, 2025

(54) IMAGE STREAM WITH COLOR METADATA

(71) Applicant: Axis AB, Lund (SE)

(72) Inventors: Niclas Danielsson, Lund (SE); Xing Danielsson Fan, Lund (SE)

(73) Assignee: AXIS AB, Lund (SE)

( * ) Notice: Subject to any disclaimer, the term of this patent is extended or adjusted under 35 U.S.C. 154(b) by 376 days.

(21) Appl. No.: 17/886,662

(22) Filed: Aug. 12, 2022

(65) Prior Publication Data

US 2023/0075041 A1 Mar. 9, 2023

(30) Foreign Application Priority Data

Sep. 9, 2021 (EP) ..................................... 21195787

(51) Int. Cl.
*G06T 7/90* (2017.01)
*G06T 7/20* (2017.01)
*G06T 7/70* (2017.01)

(52) U.S. Cl.
CPC ................. *G06T 7/90* (2017.01); *G06T 7/20* (2013.01); *G06T 7/70* (2017.01); *G06T 2207/10016* (2013.01); *G06T 2207/10024* (2013.01); *G06T 2207/20084* (2013.01)

(58) Field of Classification Search
CPC .... G06T 7/90; G06T 7/20; G06T 7/70; G06T 2207/10016; G06T 2207/10024; G06T 2207/20084; H04N 23/61; H04N 23/80; H04N 23/45
See application file for complete search history.

(56) References Cited

U.S. PATENT DOCUMENTS

| | | | |
|---|---|---|---|
| 7,199,366 B2 | 4/2007 | Hahn et al. | |
| 8,330,831 B2 * | 12/2012 | Steinberg | G06V 10/28 348/231.3 |
| 9,124,778 B1 | 9/2015 | Crabtree | |
| 10,339,410 B1 | 7/2019 | Gusarov | |
| 2010/0114617 A1 * | 5/2010 | Bobbitt | G06Q 20/202 705/75 |

(Continued)

FOREIGN PATENT DOCUMENTS

CN 107563971 A 1/2018

OTHER PUBLICATIONS

Hsieh et al., "Vehicle Color Classification Under Different Lighting Conditions Through Color Correction," in IEEE Sensors Journal, vol. 15, No. 2, pp. 971-983, (Feb. 2015).

(Continued)

*Primary Examiner* — Pinalben Patel
(74) *Attorney, Agent, or Firm* — Volpe Koenig (57) ABSTRACT

A method of transmitting an image stream together with color metadata is disclosed. The method comprises capturing image frames of a first image stream, capturing image frames of a second image stream, using camera settings for prioritizing color capture, detecting an object in a first image frame of the first image stream and determining color information associated with the object based on the second image stream. The method further comprises adding the color information as color metadata to the first image stream, encoding the first image stream, and transmitting the encoded first image stream together with the color metadata. A corresponding device is also disclosed.

17 Claims, 3 Drawing Sheets

(56) References Cited

U.S. PATENT DOCUMENTS

2015/0297949 A1* 10/2015 Aman ............... G06T 7/246
 348/157
2024/0029390 A1* 1/2024 Datar ............... G06V 30/10

OTHER PUBLICATIONS

Extended European Search Report dated Apr. 28, 2022 for European Patent Application No. 21195787.3.

* cited by examiner

IMAGE STREAM WITH COLOR METADATA

FIELD OF INVENTION

The present disclosure relates to transmission of an image stream, and specifically to transmission of an encoded image stream with color metadata for providing a color search capability.

TECHNICAL BACKGROUND

Object detection is widely used for recognizing and tracking objects and actions in video contents. The video contents may for example comprise an image stream generated by a video surveillance system. In some applications, it is also desired to determine color information of the detected object. This may for example be of particular interest in forensic-search type applications, allowing a user to perform searches based on color information of objects in the video contents.

Object detection and color detection sometimes require conflicting camera settings in order to provide images of a quality that is sufficiently high to enable both color and object detection. An image stream that is optimized for object detection may be less suitable for color detection, whereas an image stream optimized for color detection may be less suitable for object detection. This may for example be the case in low light scenarios in which the color detection may require increased exposure times, and in wide dynamic range scenarios in which the object detection may require varying exposure times and adjusted contrast settings which are less suitable for color detection.

SUMMARY

Providing methods and devices for detecting colors and objects in an image stream which overcome or mitigate issues in known methods and devices would be beneficial.

According to a first aspect, a method of transmitting an image stream together with color metadata is provided. The method comprises capturing image frames of a first image stream and capturing image frames of a second image stream using camera settings for prioritizing color capture. The method further comprises detecting an object in a first image frame of the first image stream, identifying or determining the object in a second image frame of the second image stream, and determining, based on the second image frame, color information associated with the object. The method further comprises adding the color information as color metadata to the first image stream, encoding the first image stream, and transmitting the encoded first image stream together with the color metadata.

By adding the color information as color metadata to the first image stream, a color search capability may be provided without significantly increasing the bit rate of the transmission of the encoded first image stream. The color metadata can be transmitted at a relatively low bit rate compared to techniques wherein the second image stream is added to the transmission, or wherein a fused image is created, comprising the color information.

Further, the first and second image stream can be captured using different camera settings. Hence, it is possible to capture the second image stream with camera settings aiming at optimizing color detection, without risking compromising the result of the object detection.

By camera settings prioritizing color capture is meant the use of hardware and/or software parameters that are suitable for increasing the color information comprised in the acquired image frame, thereby allowing for an improved color detection. This should for example be contrasted with camera settings aiming at optimizing object detection and/or viewability, which may prioritize contrast, brightness, sharpness, noise reduction or resolution over color capture. It will be appreciated that in some embodiments the image frames of the first image stream may be captured using such camera settings for prioritizing object detection.

The color capture may for example be improved by increasing the exposure time, which may be particularly advantageous in low-light situations, or by adding an infrared filter which is removed when capturing the image frames of the first image stream. In further examples, color capture may be improved by tuning white balance, or sensor black level.

By object detection may be understood the processing of an image with the aim of detecting instances of semantic objects of a certain class in the image frames. Preferably, the object detection may be performed using a neural network approach.

By color information is generally meant a color or hue of the detected object. The color information may further include a pattern (monochrome or polychrome), or color category. The color information associated with the object may be determined by means of color classification using a neural network approach, such as a convolutional neural network.

The metadata may for example be added after each frame of the first image stream or be common to a plurality of image frames or an entire track.

The image frames of the first image stream may be processed prior to encoding to form a greyscale image stream, thereby allowing for a reduction in bit rate of the transmission of the first image stream. The processing may involve removing the chrominance from the image frames of the first image, so that only the luminance values are sent to the encoder. By adding the color information of the detected object as metadata to the first image stream, the first image stream may be transmitted at a reduced bit rate while still providing a color search capability.

The image frames of the first image stream and the image frames of the second image stream may be captured in an alternating manner. Thus, in an example, every other image frame may be captured with the camera settings for prioritizing color capture, forming the second image stream, whereas the remaining image frames may form the first image stream. Other alternations are however also possible, such as every third or fourth image frame being captured with the camera settings for prioritizing color capture. The first and second image streams may for instance being captured using the same sensor with alternating settings.

The object that is detected in the first image frame of the first image stream may be identified or determined in the second image frame of the second image stream based on the coordinates of the object in the first image frame. This may be particularly advantageous in cases where the object detecting function works poorly on the second image stream, for instance due to the settings prioritizing color capture. In case the object has moved between the capturing of the first image frame and the second image frame, the coordinates of the object in the first image frame may be adjusted based on an object tracking functionality. The object tracking functionality may be used for estimating the movement of the object between the capturing of the first and second image frame, and providing a set of coordinates, or a region of interest, describing a possible location of the object in the second image frame. In this way, moving objects may be correctly identified or predicted in the second image stream.

The image frames of the first image stream and the image frames of the second image stream may be captured using the same image sensor. Thus, the camera settings for prioritizing color capture may refer to software parameters, such as for example exposure time, white balance, or sensor black level, used by the sensor when capturing the second image stream. The image frames of the second image stream may for example be captured using longer exposure times than what is used for the image frames of the first image stream, thereby increasing the amount of captured light to facilitate color detection.

Alternatively, the image frames of the first image stream and the image frames of the second image stream may be captured using separate image sensors. The sensors may be different in terms of hardware, where one of the sensors may be more suitable for acquiring color information. Alternatively, or additionally, the sensors may be operated using different settings with regard to for example exposure time. It will be appreciated that with such a multi-sensor configuration, the image frames of the first image stream and the image frames of the second image stream do not necessarily have to be captured in an alternating manner. On the contrary, an image frame of the first image stream and an image frame of the second image stream can be captured at the same time.

The sensors may at least partly share optical system. The light may thus follow a common optical path to a splitting device, such as a beam splitter or a prism, where the light is split to the different sensors for capturing the first and second image streams, respectively.

In some examples the image sensors may be arranged in separate camera devices, i.e., devices having separate optical systems. Thus, the first image sensor may be arranged in a first camera device, whereas the second image sensor may be arranged in a second camera device. The camera devices may have at least partly overlapping fields of view, such that the image sensors are allowed to image the same scene, or at least parts of the same scene, such that an object captured by the first image sensor also may be captured by the second image sensor. The separate camera devices may for example be arranged next to each other, in a stereoscopic setup, spaced apart by a certain distance. The cameras may hence be stationary, i.e., arranged in fixed positions relative each other, during operation. In further examples, a first one of the cameras may be stationary whereas a second one of the cameras may be movable in relation to the first one of the cameras. The movable camera may for instance be a portable camera, such as a handheld or body worn camera, and preferably oriented such that it during use allows for the same object or scene to be captured by both cameras. In further examples both cameras may be movable in relation to the scene to be imaged or monitored, and/or in relation to each other.

In case the image sensors are arranged at separate positions, such as in the above example with separate camera devices, a coordinate translation or transformation scheme may be employed to determine or locate the object in the second image stream. Parameters such as spatial separation between the image sensors or differences in sight line angles may be used as input when calculating or estimating a probable position of the object in the second image stream. These parameters may, in some examples, be known beforehand, particularly in case the cameras, in which the image sensors are arranged, are stationary in relation to each other.

Thus, in case the geometry between the image sensors are known, the position of the object in the second image stream may be calculated or assumed based on the known spatial relationship between the image sensors. In further examples the relative position of the image sensors may be determined based on position sensor data, such as position data from a gyroscopic sensor or a global navigation satellite system.

Additionally, or alternatively, the object may in some examples be determined or located in the second image stream by means of a re-identification process, comprising image processing steps for detecting (and possibly tracking) the object in the second image stream which may be similar to the ones used for detecting the object in the first image stream. The re-identification process may in some examples replace the position-based coordinate translation discussed above or used in combination with such a process.

According to a second aspect, a device is provided, comprising a circuitry configured to execute an image capturing function configured to capture image frames of a first image stream and image frames of a second image stream, wherein the image frames of the second image stream are captured using camera settings for prioritizing color capture. The circuitry is further configured to execute an object detecting function configured to detect an object in a first image frame of the first image stream, an object identifying function, or predicting function configured to determine the object in a second image frame of the second image stream, a color information determining function configured to determine, based on the second image frame, color information associated with the object, and a color information adding function configured to add the color information as color metadata to the first image stream. The device further comprises an encoder configured to encode the first image stream, and a transmitter configured to transmit the encoded first image stream together with the color metadata.

The above-mentioned optional additional features of the method according to the first aspect, when applicable, apply to this second aspect as well. In order to avoid undue repetition, reference is made to the above.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the method described as such device and method may vary. It is also to be understood that the terminology used herein is for purpose of describing particular embodiments only and is not intended to be limiting. It must be noted that, as used in the specification and the appended claims, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present disclosure will now be described in more detail, with reference to the appended figures. The figures should not be considered limiting but are instead used for explaining and understanding.

DETAILED DESCRIPTION

The present disclosure will now be described hereinafter with reference to the accompanying drawings, in which currently preferred embodiments of the disclosure are illustrated. This disclosure may, however, be embodied in many different forms and should not be construed as limited to the embodiments set forth herein.

Embodiments of the disclosure may be used to enable a color search capability of an encoded first image stream. Color, or chrominance, may be removed from the first image stream prior to coding, and the encoded first image stream may hence be transmitted in greyscale with color information associated with detected objects added as metadata. Adding the color information as metadata and transmitting the first image stream in greyscale allows for the bit rate to be reduced.

Furthermore, embodiments of the disclosure may allow for the first image stream to be captured using settings aiming at optimizing object detection or viewability, and for the second image stream to be captured using settings aiming at optimizing color capture. The first and the second image streams may in some examples be captured by separate image sensors, and in other examples by the same image sensor, using separate settings. Settings aiming at optimizing object detection may for example relate to increased contrast, wide dynamic range techniques and resolution.

Embodiments of the disclosure are particularly advantageous in low-light scenarios, where the sensor settings (such as exposure time) may need to be specifically tuned to capture as much light as possible to ensure sufficient color detection. Such a tuning may be conflicting with settings aiming at optimizing viewability for streaming, or object detection. By capturing to separate image streams, using separate sensor settings, this conflict may be addressed.

Figure 1:
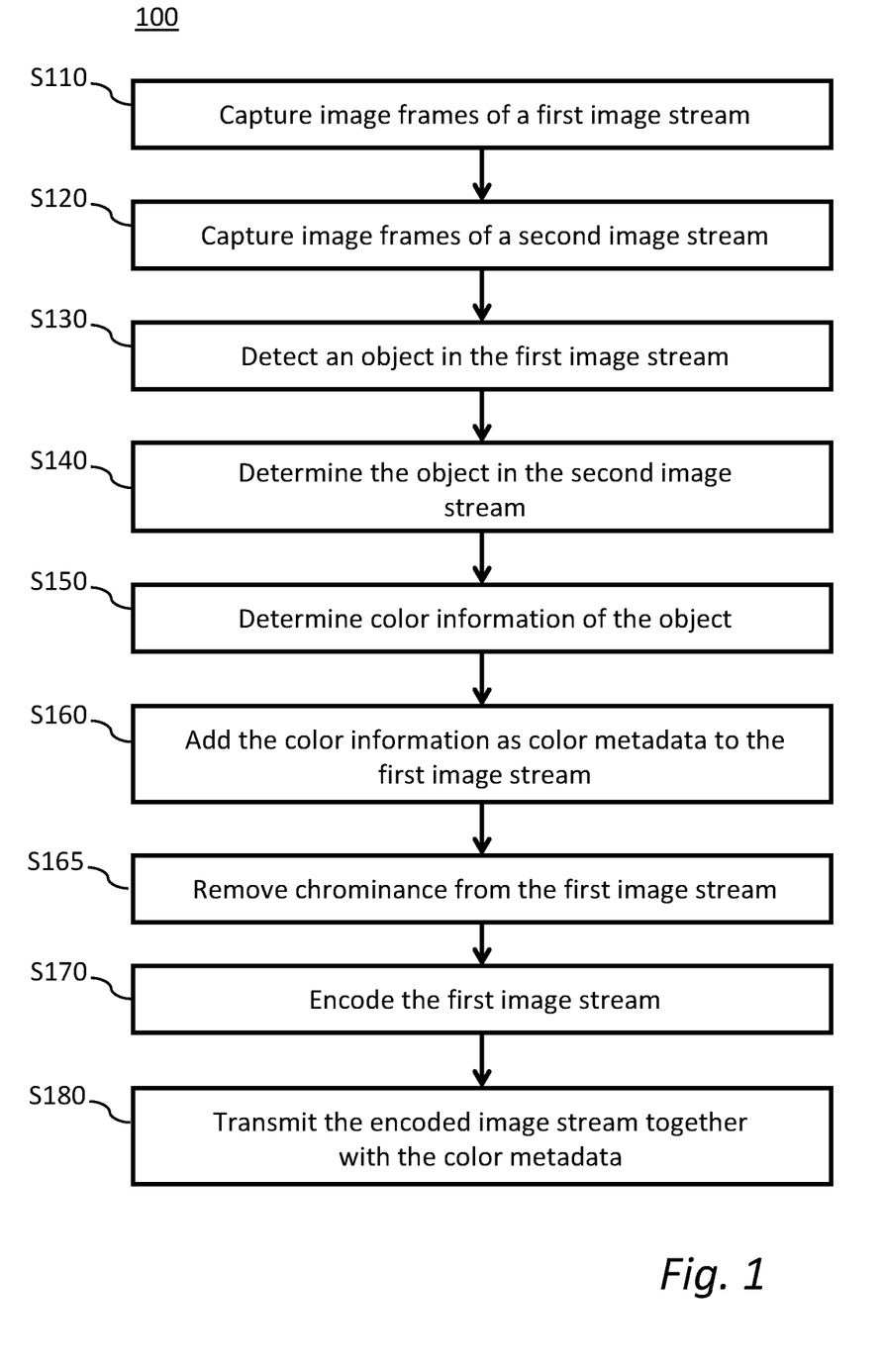
FIG. 1 shows a flow chart in relation to embodiments of a method of the present disclosure for transmitting an image stream together with color metadata.

FIG. 1 is a schematic illustration of a method according to some embodiments, wherein an image stream is transmitted together with color metadata. As illustrated in the flow chart, the method 100 comprises capturing S110 image frames of a first image stream. Further, the method 100 comprises capturing S120 image frames of a second image stream. The two image streams may be captured S110, S120 using different camera settings. In the present example, the image frames of the second image stream may be captured S120 using camera settings for prioritizing color capture. This may for example involve using slightly increased exposure times, compared to the exposure times used for capturing the image frames of the first image stream. The image frames of the first image stream may in some examples be captured S110 using camera settings for prioritizing, or aiming at optimizing, viewing, object detection or other types of machine analysis.

The capturing S110, S120 of the image frames of the first image stream and the second image stream may be performed in an alternating manner, such that for example every other image frame is captured S110 for the first image stream and every other image frame is captured S120 for the second image stream. The image frames of the first and the second image stream may in some examples be captured by separate sensors, and in other examples by the same sensor but with different settings. In case of separate sensors, the sensors may share a common optical system, such as a common optical lens, wherein the optical path may be split to the respective image sensor by means of a beam splitting device.

The method 100 may further comprise image processing steps of detecting S130 (and possibly tracking) an object in a first image frame of the first image stream. The detected object may also be referred to as an object of interest. The object detection may be performed using a method which is known per se in the art. When the object of interest is detected, the object's coordinates in the first image may be used to determine or identify S140 the object in a second image frame of the second image stream, which will be discussed in greater detail in connection with FIG. 2.

Color information that is associated with the object may then be determined S150 based on the determined object in the second image stream. The color information may be determined using color classification techniques that are known in the art. The color information may for example be provided by using a convolutional neural network, CNN, which may be trained on images with a corresponding optimized image characteristics as the second image stream. The classifier may thus be trained on color detection in images that have been captured using similar camera settings as is used for the image frames of the second image stream. The color information may for example comprise one or several colors of the object of interest, or part of the object of interest, and may in some examples include further color related information, relating to for example a (color) pattern associated with the object.

The determined color information may be added S160 as color metadata to the first image stream, preferably to the first image of the first image stream. The color metadata may for example be encoded with the first image stream or provided as a separate stream with a unique identifier connecting the metadata with the specific image frames. The color metadata allows for the color of the object of interest to be searchable in the first image stream. Thus, the present embodiment may provide a color search capability which can be used when handling the image stream. The color search capability can for example be used in forensic search applications.

Since the first image stream now carries color information associated with the object of interest added as metadata, color information, or chrominance comprised in the image frames of the first image stream may be removed or reduced prior to encoding S170. Thus, in some examples the chrominance may be removed, such that only the luminance values are sent to the encoder. Alternatively, the encoder may be instructed to encode the image frames of the first image stream in greyscale.

The encoded first image stream may then be transmitted S180 together with the color metadata describing the color of the object of interest—either embedded into the encoded image stream, or in a separated, dedicated metadata stream synched with the first image stream. The transmitted first image stream may for example be suitable for streaming, wherein a user may view the contents and add search queries relating to the color information associated with objects of interest, for which the associated color information may be included as metadata.

Even though the above example describes embodiments wherein an object (of interest) is detected, identified and color classified, it will be appreciated that color information may as well be determined in a similar manner for several objects, or parts of objects, in the first image stream. Consequently, it will be appreciated that the color of each of those objects or object parts may be added as color metadata to the first image stream.

Figure 2:
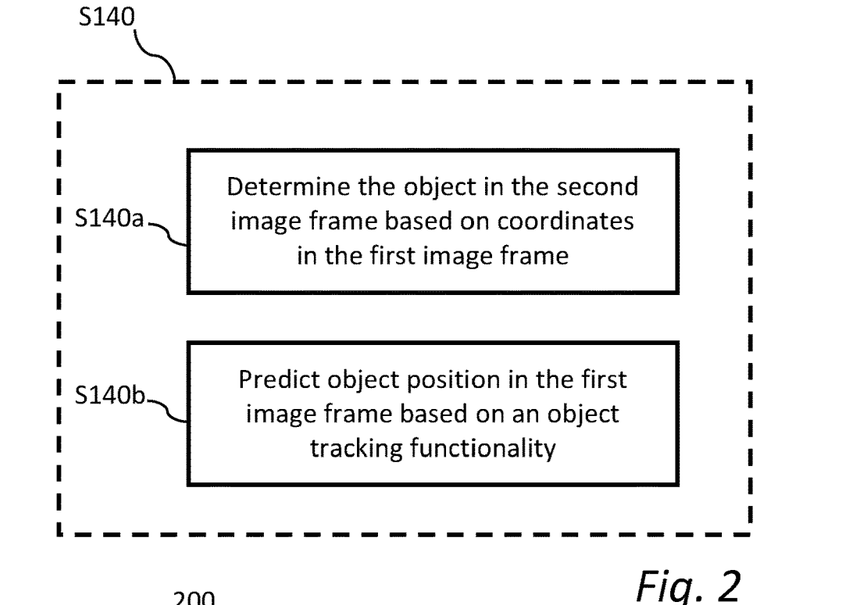
FIG. 2 shows an illustrating example of steps of the method shown in FIG. 1.

FIG. 2 illustrates an example wherein the object of interest is determined or identified S140a in the second image frame of the second image stream based on the coordinates of the object of interest in the first image frame of the first image stream (which is possibly captured using camera settings aiming at optimizing object detection). In case the first and second image frames are taken at slightly different points in time, which may be the case when the first and second image streams are captured in an alternating manner, information from a tracker functionality, or tracker, may be used to predict S140b the coordinates of the object's position in the second image. This enables estimating how far and in which direction the object would have moved before the corresponding frame in the second image stream was captured. In cases where the tracking works well, the number of frames needed for color optimization may be reduced as the corresponding object coordinates may still be possible to find. This is of particular interest in case the first and second image streams are captured alternatingly and wherein the color optimized second image stream is created only during the time period when an object as detected. It will however be appreciated that the color optimized second image stream in alternative implementations may be constantly, or continuously, captured regardless of whether an object has been detected or not. In further alternatives, the number of frames of the second image stream may be reduced for certain time periods, such as time periods wherein no object is detected.

Figure 3A:
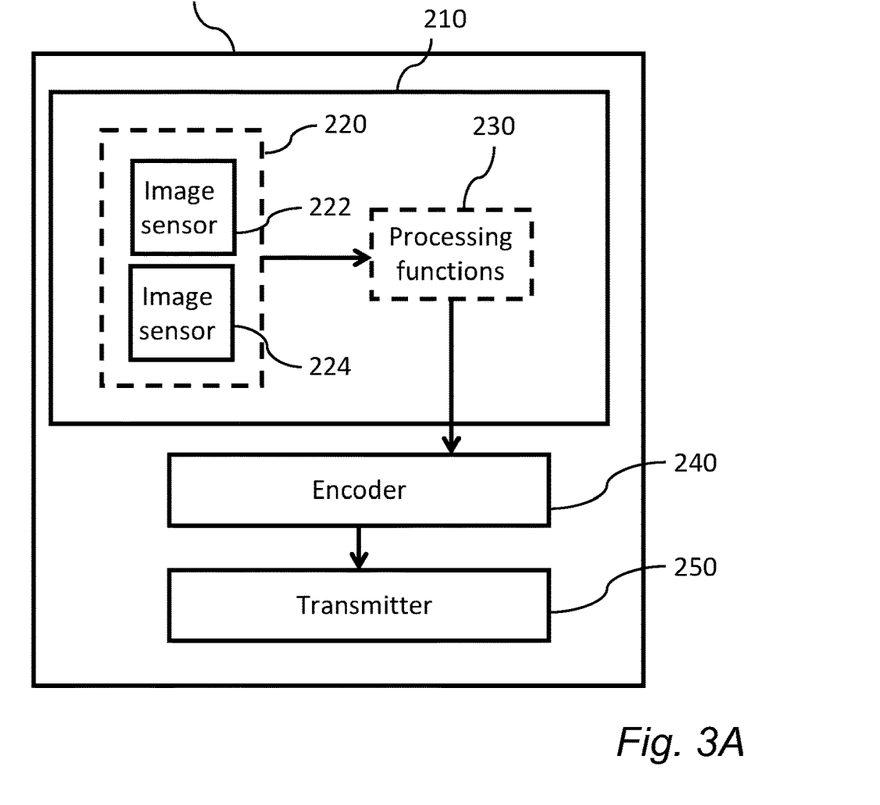
FIG. 3A shows an illustration of an example of a device according to an embodiment of the present disclosure.

FIG. 3A is a schematic block diagram of embodiments of a device 200 for transmitting an image stream together with color metadata in a similar manner as described with reference to the previous figures. The device 200 comprises circuitry 210 configured to carry out functions of the device 200. The circuitry 210 may comprise a processor, such as a central processing unit, CPU, microcontroller, or microprocessor configured to execute program code. The program code may for example be configured to carry out processing functions 230 of the device 200, such as an image capturing function 220, an object detecting function 232, an object tracking function 233, an object predicting function 234, or object identifying function 234, a color information determining function 236, a color information adding function 238 and a chrominance removing function 239 as will be discussed in the following with reference to FIG. 3B.

The device 200 may further comprise a memory (not shown). The memory may be one or more of a buffer, a flash memory, a hard drive, a removable media, a volatile memory, a non-volatile memory, a random-access memory (RAM), or another suitable device. In a typical arrangement, the memory may include a non-volatile memory for long term data storage and a volatile memory that functions as system memory for the circuitry 210. The memory may exchange data with the circuitry 210 over a data bus. Accompanying control lines and an address bus between the memory and the circuitry 210 also may be present.

The processing functions 230 of the device 200 may be embodied in the form of executable logic routines (e.g., lines of code, software programs, etc.) that are stored on a non-transitory computer readable medium (memory) of the device 200 and are executed by the circuitry 210, e.g., using the processor in the circuitry 210. Furthermore, the processing functions 230 of the device 200 may be a stand-alone software application or form a part of a software application. The described functions may be considered a method that a processing unit, e.g., the processor of the circuitry 210 is configured to carry out. Also, while the described functions 230 may be implemented in software, such functionality may as well be carried out via dedicated hardware or firmware, or some combination of hardware, firmware and/or software.

The image capturing function 220 may be configured to capture image frames of a first image stream and image frames of a second image stream. The image frames of the second image stream may be captured using camera settings, or image sensor settings, for prioritizing color capture. The first and second image stream may be captured by means of a single image sensor, or by means of two or more image sensors 222, 224. In the example illustrated in the present figure, the device 200 may comprises a first image sensor 222 and a second image 224, wherein the first image sensor 222 may be configured to capture the first image stream and the second image sensor 224 configured to capture the second image stream. The first image sensor 222 may for instance be arranged in a first camera device (not shown), whereas the second image sensor 224 may be arranged in a second camera device (not shown). The camera devices may be arranged spatially apart, and the distance between the camera devices (and thus the image sensors) may be used as input when determining or locating the object in the second image stream. The cameras may be configured to transmit the captured first and second image streams to the processing functions 230. The image sensor(s) 222, 224 may for example comprise an active-pixel sensor, such as a complementary metal-oxide-semiconductor, CMOS, sensor.

Figure 3B:
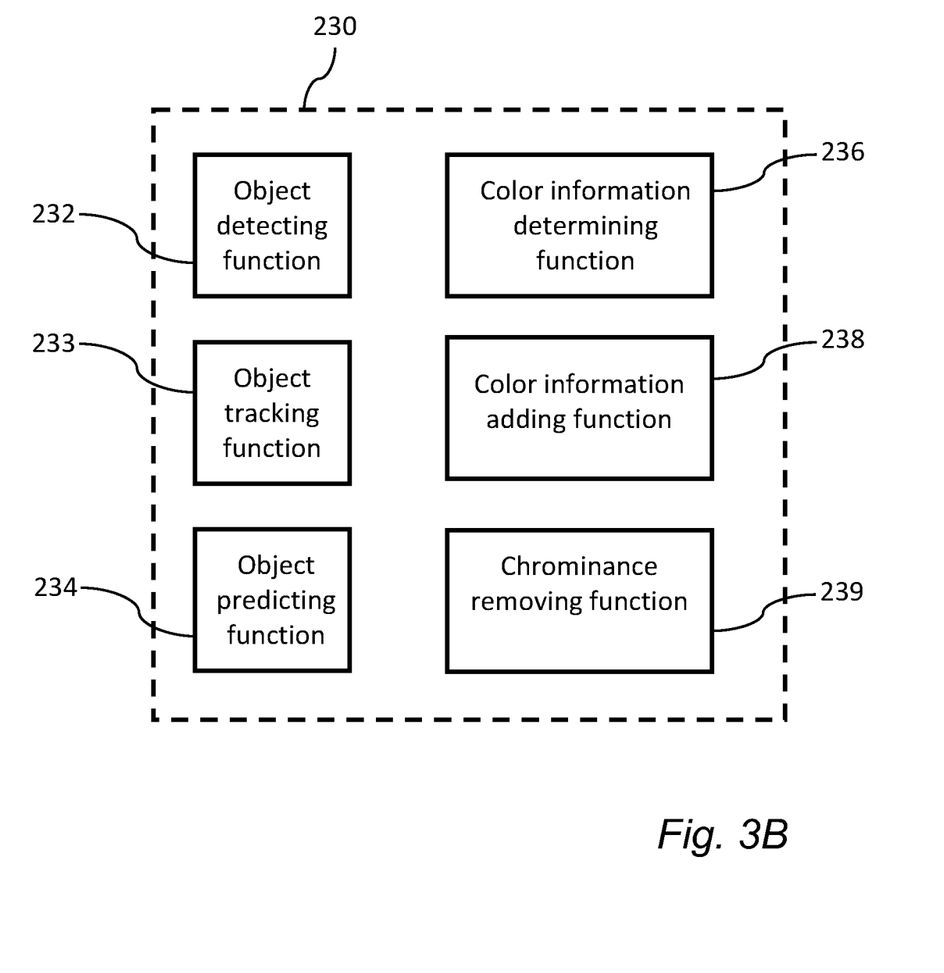
FIG. 3B shows an illustration of an example of a processing function of the device in FIG. 3A.

As indicated in FIG. 3B, the circuitry 210 may be configured to execute an object detecting function 232 for detecting an object in a first image frame of the first image stream, and further to execute an object predicting or determining function 232 for predicting the detected object in a second image frame of the second image stream. The determining (also referred to identifying) of the object in the second image stream may involve an object tracking function 233, which based on the coordinates of the object in the first image frame may provide an estimated position of the object in the second image frame. This may be of particular interest in cases where the object detecting function works poorly on the second image stream due to the color optimized settings.

The circuitry 210 may further be configured to execute a color information determining function 236 for determining color information associated with the object identified in the second image frame.

The circuitry 210 may further be configured to execute a color information adding function 238 for adding the color information as color metadata to the first image stream, and in some example execute a chrominance removing function 239 for removing chrominance from the first image stream.

As illustrated in FIG. 3A the device 200 may further comprise an encoder 240 configured to encode the first image stream, and a transmitter 250 configured to transmit the encoded first image stream together with the color metadata.

The device 200 and the functions carried out by the circuitry 210 may be further adapted as the method 100 and the corresponding steps of the method 100 described in relation to FIGS. 1 and 2, respectively.

A person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A method of transmitting an image stream together with color metadata, comprising:
   capturing image frames of a first image stream;
   capturing image frames of a second image stream, using camera settings for increasing an amount of color information in the second image stream compared to an amount of color information in the first image stream;
   detecting an object in a first image frame of the first image stream;
   identifying the object in a second image frame of the second image stream;
   determining, based on the second image frame, color information associated with the object;
   adding the color information as color metadata to the first image stream;
   encoding the first image stream; and
   transmitting the encoded first image stream together with the color metadata, wherein the color metadata is included in a separate, dedicated metadata stream synched with the encoded first image stream.

2. The method according to claim 1, comprising removing chrominance from the image frames of the first image stream prior to encoding.

3. The method according to claim 1, comprising alternately capturing the image frames of the first image stream and the image frames of the second image stream.

4. The method according to claim 1, comprising capturing the image frames of the second image stream using an infrared filter and removing the infrared filter when capturing the image frames of the first image stream.

5. The method according to claim 1, further comprising determining the object in the second image frame based on coordinates of the object in the first image frame.

6. The method according to claim 5, wherein determining the object in the second image frame further comprises adjusting the coordinates of the object in the first image frame based on an object tracking functionality.

7. The method according to claim 1, wherein determining the color information associated with the object comprises color classification using a convolutional neural network.

8. The method according to claim 1, wherein the image frames of the first image stream and the image frames of the second image stream are captured using the same image sensor.

9. The method according to claim 1, wherein the image frames of the first image stream and the image frames of the second image stream are captured using separate image sensors arranged to image the same scene.

10. The method according to claim 1, wherein the image frames of the first image stream are captured using camera settings for prioritizing object detection over color capture.

11. A device comprising a circuitry configured to execute:
    an image capturing function configured to capture image frames of a first image stream and image frames of a second image stream, wherein the image frames of the second image stream are captured using camera settings for increasing an amount of color information in the second image stream compared to an amount of color information in the first image stream;
    an object detecting function configured to detect an object in a first image frame of the first image stream;
    an object identifying function configured to identify the object in a second image frame of the second image stream;
    a color information determining function configured to determine, based on the second image frame, color information associated with the object; and
    a color information adding function configured to add the color information as color metadata to the first image stream;
    wherein the device further comprises:
    an encoder configured to encode the first image stream; and
    a transmitter configured to transmit the encoded first image stream together with the color metadata, wherein the color metadata is included in a separate, dedicated metadata stream synched with the encoded first image stream.

12. The device according to claim 11, wherein the circuitry is further configured to execute a chrominance removing function for removing chrominance from the first image stream.

13. The device according to claim 11, further comprising an image sensor configured to alternately capture the image frames of the first image stream and the image frames of the second image stream.

14. The device according to claim 11, further comprising at least two separate image sensors configured to alternately capture the image frames of the first image stream and the image frames of the second image stream, wherein the separate image sensors are arranged to image the same scene.

15. The device according to claim 11, wherein the circuitry is further configured to execute an object tracking function for tracking a movement of the object, wherein the object identifying function is further configured to identify the object in the second image frame based on input from the object tracking function.

16. A method of transmitting an image stream together with color metadata, comprising:
    capturing image frames of a first image stream;
    capturing image frames of a second image stream, using camera settings for increasing an amount of color information in the second image stream compared to an amount of color information in the first image stream;
    detecting an object in a first image frame of the first image stream;
    identifying the object in a second image frame of the second image stream;
    determining, based on the second image frame, color information associated with the object;
    adding the color information as color metadata to the first image stream;
    encoding the first image stream, wherein the color metadata is embedded in the encoded first image stream; and
    transmitting the encoded first image stream together with the color metadata.

17. A device comprising a circuitry configured to execute:
    an image capturing function configured to capture image frames of a first image stream and image frames of a second image stream, wherein the image frames of the second image stream are captured using camera settings for increasing an amount of color information in the second image stream compared to an amount of color information in the first image stream;
an object detecting function configured to detect an object in a first image frame of the first image stream;
an object identifying function configured to identify the object in a second image frame of the second image stream;
a color information determining function configured to determine, based on the second image frame, color information associated with the object; and
a color information adding function configured to add the color information as color metadata to the first image stream;
wherein the device further comprises:
an encoder configured to encode the first image stream, wherein the color metadata is embedded in the encoded first image stream; and
a transmitter configured to transmit the encoded first image stream together with the color metadata.

* * * * *